Patented Mar. 7, 1933

1,900,216

UNITED STATES PATENT OFFICE

JOSHUA CHITWOOD WITT, OF CHICAGO, ILLINOIS

COLORING MATERIAL

No Drawing.   Application filed January 28, 1929.   Serial No. 335,745.

My invention relates to the use of coloring materials or pigments in coloring cements, plasters, mortars, concretes and other plastic materials, particularly those, such as mortars and concretes, in which a cement is used as the binding medium. However, my method is available, in general, in any situation wherein a pigment needs to be applied to or widely dispersed through a plastic mass.

In particular I prefer to employ colloidal coloring materials or pigments, or to reduce the pigment or coloring material to colloidal form or condition or fineness, before the final mixture is allowed to set. There are a number of advantages in employing a pigment which is reduced to colloidal condition or fineness. Colloidal pigments can be more completely, uniformly and easily blended with the substances to be colored, than can ordinary pulverized coloring materials. A pigment which is reduced to colloidal fineness will in general not settle, even though it may be left in water or mix for a considerable time. On the other hand, pulverized pigments, even if finely pulverized, if the fineness is short of colloidal fineness, will settle appreciably and often rapidly. When employing non-colloidal but finely divided pigments, difficulty may be experienced with settling, which tends to give an uneven distribution of pigment in the mass.

Furthermore, pigments when reduced to colloidal fineness have a much higher tinting value than merely pulverized pigments. That is to say, a smaller mass is needed for coloring a batch of a plastic material to a desired intensity, than would be the case where a merely pulverized pigment is employed.

A colloidal solution can be used with much the same facility as a true solution. Many pigments which are desirable on the basis of cost or stability or color tone or the like, that can be reduced to colloidal form and that can be used in accordance with the present method, are not available for use in true solutions, for example because they may be insoluble in water or insoluble in solvents which may be mixed with water.

Certain surface effects and distributions of pigments can be obtained with colloidal pigments, which cannot be obtained at all, or can be obtained only with considerable difficulty with pulverized pigments.

In preparing colloidal coloring materials I prefer to use mechanical disintegration, a dispersion method, and suggest as particularly available the disintegration of the pigments by the use of a colloid mill. The result of passing pigment through such a mill is a reduction of the particles of pigments, or a very substantial proportion of them to colloidal fineness. In my description and claims, in using the term "colloidal fineness" in relation to the particles of the pigment I wish to be understood as meaning such a fineness of the particles as will cause them to act substantially as a colloid. I further wish it to be understood that I employ that term sufficiently broadly to cover the conversion or reduction of a substantial or preponderant proportion of the particles to substantially colloidal fineness.

In other words in the regular practice of my method, under operating conditions, it may be that not all the particles will be of colloidal fineness. None the less the effect of the pigment, owing to the large proportion of particles which are reduced to colloidal or substantial colloidal fineness, will be that of a colloid. I do not wish to be limited, in the practice of my invention, or in the interpretation of my claims, to a definition of the word "colloidal", or "colloid" which would respond to the severity of laboratory conditions.

My preferred method is as follows. I may mix a pigment with a protective colloid, such as a starch, glue, gum or some other substance, and cement. Such mixture may also have as much water added to it as is needed. In practice, when using a colloid mill, I may employ only sufficient water to make the mixture easy to handle in the mill. I then run the mixture, which should run freely, through the colloid mill, during which process the pigment is largely, if not entirely reduced to colloidal size.

The process may be varied by mixing the pigment, water, protective colloid, cement, and a finely ground aggregate, before running the entire mixture through the colloid mill.

One characteristic feature of my invention is the employment of a protective colloid which is mixed with the pigment prior to the reduction of the pigment to colloid form. Another characteristic feature is the mechanical disintegration of the pigment to colloid form at the time of its mingling with the plastic material.

Whereas I have described and in some claims am claiming mechanical disintegration, for example by the use of a colloid mill, I do not wish to be so limited except so far as I specifically set it out in my claims. It is possible also to prepare colloidal coloring materials by condensation. The details of such preparation do not form per se part of my method, but colloidal solutions so formed would be available for the practice of my invention. While I prefer the use of a colloid mill, I may also use any other dispersion method.

In fact I wish my description to be taken as in a broad sense illustrative rather than as limiting me precisely to the disclosure herein set out, since many variations of my method may be made without departing from my teachings, while remaining within the spirit of my invention.

Where in the specification and claims I have said color, I mean, of course, to include black, white or any true color and I do not limit myself to anything which is in the technical sense a color.

I claim:

1. The method of preparing pigmented plastic material, which includes mixing a pigment with a stabilizing agent and with hydraulic cement, passing such mixture through a colloid mill, and thereby reducing such pigment, while mixed with the stabilizing agent, to colloidal fineness and adding said mixture to the plastic material.

2. The method of preparing pigmented plastic material employing hydraulic cement as a binder, which includes mixing a pigment with a protective colloid and with hydraulic cement, passing such mixture through a colloid mill, and thereby reducing such pigment, while mixed with the protective colloid, to colloidal fineness and then introducing said mixture into the plastic material.

3. The method of preparing pigmented plastic material, which includes mixing a pigment with a protective colloid, a finely ground aggregate and hydraulic cement, passing such mixture through a colloid mill, and thereby reducing such pigment, while mixed with the protective colloid, finely ground aggregate and cement, to colloidal fineness, adding water to said mixture and then introducing the mixture into the plastic material.

Signed at Chicago, county of Cook and State of Illinois, this 26th day of January 1929.

JOSHUA CHITWOOD WITT.